Feb. 20, 1940. M. L. RYAN Re. 21,367

ATTACHMENT FOR WINDSHIELD WIPERS

Original Filed Sept. 30, 1937

INVENTOR
Maurice L. Ryan,
BY
Beau, Brooks, Buckley & Beau.
ATTORNEYS

Reissued Feb. 20, 1940

Re. 21,367

UNITED STATES PATENT OFFICE 21,367

ATTACHMENT FOR WINDSHIELD WIPERS

Maurice L. Ryan, St. Paul, Minn., assignor, by mesne assignments, to Trico Products Corporation, a corporation of New York Original No. 2,141,023, dated December 20, 1938, Serial No. 166,549, September 30, 1937. Application for reissue November 16, 1939, Serial No. 304,875

6 Claims. (Cl. 15—250)

It is my object to provide a novel device adapted to be quickly and easily attached to a windshield wiper blade for applying an anti-freeze solution continuously during the periods when it is necessary or desirable to remove sleet, snow, frost and the like from the windshield.

The windshield wipers in common use efficiently remove moisture at temperatures substantially above the freezing point of water but are ineffectual at and somewhat below the freezing point. The device of this invention is adapted to absorb an unusually large supply of anti-freeze composition or solution and may be quickly and easily attached to an ordinary windshield wiper blade so that the latter is made effective to melt and remove the adhering particles of frozen moisture continuously over a considerable period of time.

Figure 1:
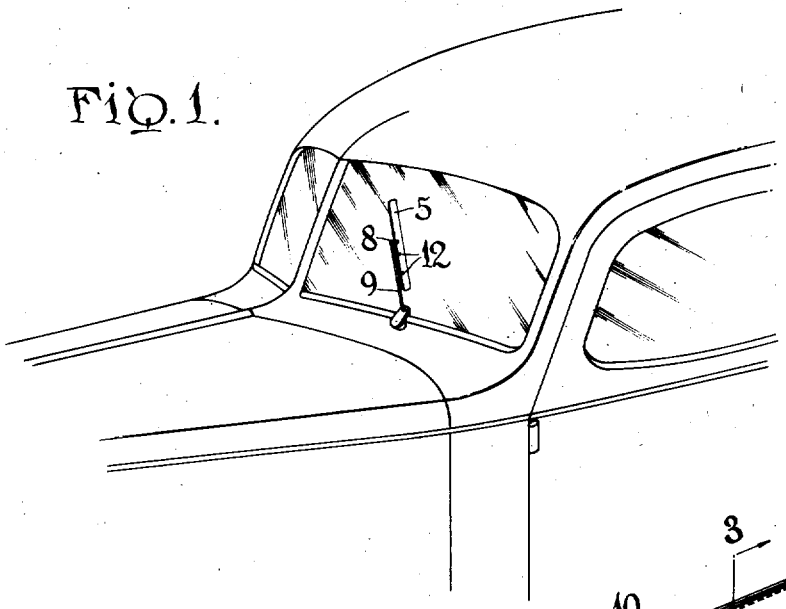
Fig. 1 illustrates my device attached to a windshield wiper of common type.
Figure 2:
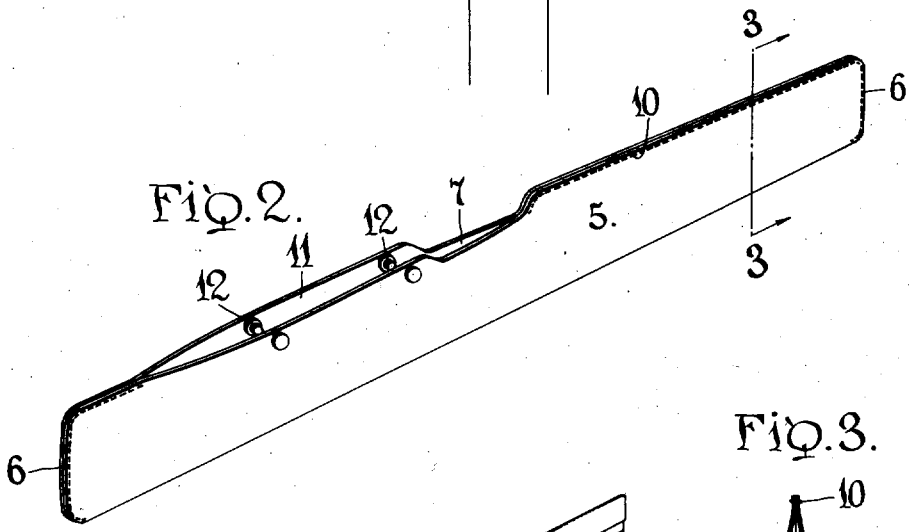
Fig. 2 is a perspective view of the device detached from the wiper.
Figure 3:
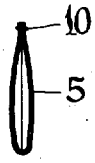
Fig. 3 is a cross sectional view taken on the line 3—3 of Fig. 2.
Figure 4:
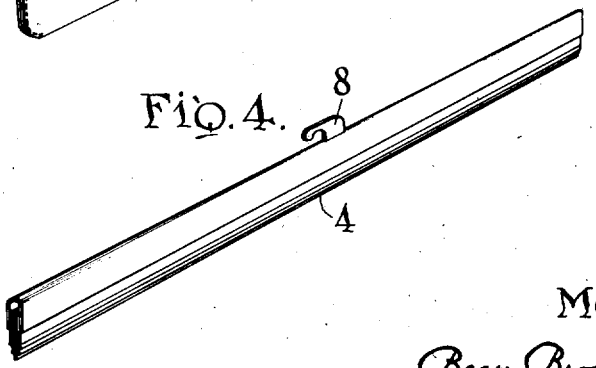
Fig. 4 is a perspective view of a wiper blade of one of the types to which my device may be attached.

Referring to the drawing, the numeral 5 indicates the body of my device which is constructed from a narrow and relatively long strip of absorbent material, such as a felt or textile fabric. This strip is folded upon itself along its longitudinal center line and is formed into a sleeve adapted to completely envelope a windshield wiper blade indicated by the numeral 4. Both ends of the sleeve-like body 5 are closed as by the stitches 6 and centrally, at one longitudinal edge, an opening 7 is provided to receive an attaching device 8 for the wiper operating arm 9 (Fig. 1). At one side of the central opening 7, the body 5 is closed by stitches 10 and at the other side there is an elongated opening 11 adapted to be closed by snap fasteners 12.

When weather conditions are such that the use of the device is desirable, the flexible body 5 is preferably rolled upon itself longitudinally to form a compact, substantially cylindrical roll and a suitable quantity of an anti-freeze liquid, such as a mixture of glycerine, alcohol and water is applied to the roll. Thus the entire member 5 is thoroughly moistened or impregnated and then after inserting one end of the blade 4 into the body 5, parallel to the stitches 10, the other end of the blade may be passed in through the opening 11 and the device securely attached to the blade by engaging the fasteners 12. It will be understood that the blade 4 need not be removed from the arm 9 for the attachment of my device and the operation of applying the anti-freeze substance to the body 5 and latter to the blade may be quickly performed by operators entirely unskilled in mechanical matters.

When my device is in place on the wiper blade the latter is completely enveloped in the absorbent sleeve which is of such size and extent as to carry sufficient anti-freeze solution to operate effectively for a period of several hours. The anti-freeze solution is gradually applied to the windshield surface from the smooth, folded edge of the body 5 and continuously reduces the frozen particles to a liquid which is readily wiped from the surface.

When not required, my device may be quickly and easily removed from the wiper blade and the latter may be used separately. The device has the further advantage of simplicity and low cost and experience has shown that it is unusually effective.

Having described my invention, what I claim as new and desire to protect by Letters Patent is:

1. An attachment for a windshield wiper blade comprising, a sleeve formed entirely from flexible, absorbent material adapted to envelope said blade and having an opening along one edge permitting the insertion of the blade into said sleeve and means for closing said opening, said sleeve being adapted to be rolled longitudinally on itself to receive a charge of liquid anti-freeze composition.

2. An attachment for a windshield wiper blade comprising, a long, narrow, absorbent and flexible sleeve formed to completely envelope said blade, said sleeve being closed at its ends and having an opening along one edge permitting the insertion of the blade into the sleeve and means for closing said opening.

3. An attachment for a windshield wiper blade comprising, an absorbent, flexible sleeve formed to completely envelope said blade, having an opening centrally located at one edge to receive an arm for operating said blade and formed with a continuation of said opening extending toward an end to permit the insertion of the blade into the sleeve and means for closing the continuation of said opening.

4. An attachment for a windshield wiper blade comprising a tubular sleeve formed entirely from flexible, absorbent material adapted to completely envelope said blade and having an opening permitting the insertion of the blade lengthwise into the sleeve, said sleeve being adapted to be rolled longitudinally on itself to receive a charge of liquid anti-freeze composition and having a portion permanently closed across its back for the blade to engage beneath by such lengthwise insertion.

5. An attachment for a windshield wiper blade having an arm connecting device projecting from its back, comprising a tubular body formed entirely from flexible absorbent material and opened at one end portion for the insertion of the blade lengthwise into the opposite end portion to completely enclose the blade, said body being adapted to be flexed throughout to receive a charge of liquid cleaning composition and having an opening in its back through which the arm connecting device interlockingly projects.

6. An attachment for a windshield wiper blade having a device projecting from its back for connecting the wiper blade to an actuating arm, said attachment comprising a tubular body of flexible absorbent material adapted to envelope the blade completely thereabout, the closed portion of the envelope across the back of the blade being formed with an opening for exposing the connecting device, said body being substantially wholly flexible throughout for being flexed upon itself to receive a charge of liquid anti-freeze composition.

MAURICE L. RYAN.